United States Patent [19]

Bailey et al.

[11] Patent Number: 4,508,891

[45] Date of Patent: Apr. 2, 1985

[54] SHAPED ARTICLES FORMED FROM POLYMERS CAPABLE OF EXHIBITING ANISOTROPIC MELTS

[75] Inventors: Derrick S. Bailey, Welwyn; Frederic N. Cogswell, Welwyn Garden City; Brian P. Griffin, St Albans, all of England

[73] Assignee: Imperial Chemical Industries, PLC, England

[21] Appl. No.: 463,292

[22] Filed: Feb. 2, 1983

Related U.S. Application Data

[63] Continuation of Ser. No. 282,952, Jul. 13, 1981, abandoned.

[30] Foreign Application Priority Data

Jul. 16, 1980 [GB] United Kingdom ............... 8023193

[51] Int. Cl.³ ............... C08G 63/18; B29C 25/00; B29D 27/00
[52] U.S. Cl. ............... 528/191; 264/54; 264/237; 264/257; 264/328.12; 264/DIG. 83; 521/182; 528/176; 528/195
[58] Field of Search ....... 264/328.9, 328.12, DIG. 83, 264/54, 257, 237; 528/191, 176, 195; 521/182

[56] References Cited

U.S. PATENT DOCUMENTS

| | | | |
|---|---|---|---|
| 2,200,633 | 5/1940 | Morin et al. | 264/328.9 X |
| 2,453,739 | 11/1948 | Bates | 264/328.9 X |
| 3,384,691 | 5/1968 | Weissman et al. | 264/DIG. 83 |
| 3,526,588 | 9/1970 | Michaels et al. | 210/500.2 |
| 3,556,992 | 1/1971 | Massucco | 210/500.2 |
| 3,567,810 | 3/1971 | Baker | 210/500.2 |
| 3,709,774 | 1/1973 | Kimura | 210/500.2 |
| 3,724,672 | 4/1973 | Leonard et al. | 210/500.2 |
| 3,754,375 | 8/1973 | Bouchilloux et al. | 521/64 |
| 3,806,564 | 4/1974 | Riley et al. | 210/500.2 |
| 3,847,822 | 11/1974 | Shuey | 210/500.2 |
| 3,988,245 | 10/1976 | Wang | 210/500.2 |
| 3,991,013 | 11/1976 | Pletcher | 528/191 |
| 3,991,014 | 11/1976 | Kleinschuster | 528/191 |
| 4,073,724 | 2/1978 | Chapurlat | 210/500.2 |
| 4,305,902 | 12/1981 | Uhlig | 264/328.12 X |

FOREIGN PATENT DOCUMENTS 1507207 4/1978 United Kingdom .

*Primary Examiner*—Philip Anderson
*Attorney, Agent, or Firm*—Cushman, Darby & Cushman

[57] ABSTRACT

Shaped articles are provided containing a polymer which is capable of exhibiting anisotropy in the melt characterized in that the ratio of the stiffness in any two directions at right angles in the shaped article differs by at least 10%, and preferably by at least 50%, from the ratio in the same two directions for a control sample made from a melt consisting entirely of the polymer in anisotropic form.

These may be obtained by a variety of methods including disturbing the normal flow pattern of flow into a mould by including obstacles to flow in the mould, disturbing the pattern of flow by foaming in the mould, by including fillers or by using polymers capable of existing as a bi-phase anisotropic and isotropic melt and forming shaped articles in which this two-phase disposition is retained.

6 Claims, 6 Drawing Figures

SHAPED ARTICLES FORMED FROM POLYMERS CAPABLE OF EXHIBITING ANISOTROPIC MELTS

This is a continuation of application Ser. No. 282,952, filed July 13, 1981, and now abandoned.

This invention relates to shaped articles formed from polymers capable of exhibiting anisotropic behaviour in the melt.

There has been considerable interest recently in polymers which are capable of forming an anisotropic melt. The interest in these polymers stems from the ordering of the molecules in melts of the polymer. As a consequence of the ordering the melts have a relatively low viscosity giving easy processability and products obtained from the melt have a high degree of orientation leading to enhanced physical properties in the product, such as strength and stiffness. In some circumstances a disadvantage of products moulded using a melt in this form is the directional imbalance in properties resulting from the high orientation. Shaped articles have now been obtained from anisotropic polymer melts which have taken advantage of the low melt viscosity but in which the anisotropy in the shaped article has been usefully reduced.

Accordingly there is provided a shaped article containing a polymer which is capable of exhibiting anisotropy in the melt characterised in that the ratio of the stiffness in any two directions at right angles in the shaped article differs by at least 10%, and preferably by at least 50%, from the ratio in the same two directions for a control sample made from a melt consisting entirely of the polymer in anisotropic form.

The ratio of the stiffness in two directions at right angles in the shaped article, hereinafter termed the anisotropy ratio is a measure of the extent to which the polymer molecules are aligned in the sample. Preferably the directions should be chosen along and transverse to the principal flow direction of the melt in forming the article. Commonly, melts of anisotropic polymers show much greater stiffness in the flow direction. Typical values for the anisotropy ratio of control samples made from unmodified anisotropic melts are of the order of 4:1 and can be as high as 6:1 or more for highly oriented articles. Desirably this ratio should be reduced to a value of between 0.5 and 2.0.

Such products can have a variety of compositions and be made by a variety of methods.

In the first place such articles, hereinafter referred to as "orientation modified articles", may consist entirely of the polymer which is capable of forming an anisotropic melt. It is possible to form orientation modified articles from such polymers because it has been observed that many liquid crystal forming polymers exhibit a two-phase melt over a narrow but specific temperature range immediately below the temperature at which the polymer transforms to the wholly isotropic state. This two-phase system consists of a mixture of the polymer in isotropic and anisotropic form. By using processing conditions in which the two-phase melt is cooled sufficiently quickly to retain the disposition of molecules in the two-phase melt form articles are produced which contain a mixture of the polymer in oriented and random form.

As one aspect of the invention there is provided a process of forming a shaped article from a polymer which is capable of exhibiting anisotropy in the melt comprising obtaining a melt of the polymer in a temperature range over which the polymer exhibits a two-phase melt of the polymer molecules in both isotropic and anisotropic form and below the decomposition temperature of the polymer, preparing a shaped article from such a melt and quenching the melt. Preferably the melt is processed at least 5° C. above the temperature at which the melt is wholly anisotropic but at a temperature below that at which the melt is wholly isotropic. It is possible to use the process of the invention by forming a melt at a temperature high enough to give a totally isotropic melt and subsequently to form the shaped article under conditions at which the melt has cooled sufficiently to exhibit a two-phase melt. However, this process may suffer from the disadvantage that the melt in the totally isotropic form is then near or above the decomposition temperature of the polymer.

The process of the invention takes advantage of the substantial lowering in melt viscosity experienced in moving from wholly isotropic to wholly anisotropic melts. Although the viscosity of the two-phase melt may not be as low as the wholly anisotropic melt it is still sufficiently mobile for processes such as injection moulding. Articles produced from such a process have a more desirable balance of properties than those produced from a wholly anisotropic melt.

The polymers which are suitable for use in the invention do not include all those which are capable of forming an anisotropic melt. The ability of an anisotropic melt forming polymer to exist also as an isotropic melt is readily determined by the conventional optical techniques used to determine the presence of anisotropic melts as described, for example in British Patent Specification No. 1 507 207. The ability of the selected polymer to exist as a two-stage melt over a wide enough temperature to enable practical fabrication of shaped articles containing the desired mixture of polymer in oriented and non-oriented form can then be verified by microscopic observation of the melt in the polarising microscope. Whether a useful working range exists is dependent to a large extent on the composition of the polymer. The ability to form two-phase systems is enhanced by the presence of non-para directed and flexible building units within the polymer chain but ultimate choice of composition must be determined simply by optical observation on whether a two-phase melt exists over a suitably wide temperature range.

Apart from the choice of polymer composition the extent of this range can be broadened to some extent by the application of shear or pressure to the melt. The application of shear may induce wholly isotropic melts to form some polymer in oriented form.

A further major advantage of the process in which a two-phase melt is used to produce an orientation modified article is that the modification is brought about by a method in which the modifying species is a wholly compatible polymer because it is identical in composition with the anisotropic polymer species. The invention is, however, not limited to the use of two-phase systems in which the polymer composition of each phase is identical. The invention includes systems in which more than one species of polymer capable of exhibiting a two-phase melt is present providing that the polymers present have identical or almost identical solubility parameters. The use of a mixture of polymers of a given family prepared from the same reactants but with different proportions of the constituent reactant materials will fulfil this criterion and have the advantage that the useful processing range over which two phases exist can be broadened.

The invention also includes the use of any mixture of compatible polymers providing that at least one is present as a two-phase melt of isotropic and anisotropic phases. Particularly suitable are those where the solubility parameter as calculated by the well known methods (see for example Small, Journal of Applied Chemistry 1973, (3) page 71) do not differ by more than 2 units $(g.cc)^{\frac{1}{2}}$. Alternatively, the compostions can be virtually identical with the sole exception that some of the para linked moieties are replaced by non linear, difunctional units of some type. This is effected in such a way that the lower working temperature of the more rigid composition coincides or overlaps the highest working temperature of the more flexible components. Some useful broadening can also be achieved by mixing identical or closely related polymers of different molecular weights. Higher molecular weight polymers normally generate an isotropic phase at higher temperatures than their lower molecular weight counterparts.

Accordingly there is also provided a process of forming a shaped article comprising forming a melt from a mixture of polymers which differ in solubility parameter by not more than 2 units at least one of which polymers is present as a two-phase melt containing anisotropic and isotropic species, the remaining polymer or polymers also being present in molten form. The remaining polymer or polymers may be capable of forming a melt which also contains both anisotropic and isotropic species, or is wholly anisotropic or is wholly isotropic, the sole requirement being that the melt of the total blend contains both anisotropic and isotropic species and at least one of the polymers is present as a two-phase melt.

Orientation-modified articles are obtainable from a number of other compositions which do not rely on the presence of the two-phase melt system.

According to a further aspect of the invention there is provided a shaped article containing a polymer capable of exibiting anisotropy in the melt characterised in that the ratio of the stiffness in any two directions at right angles in the shaped article differs by at least 10%, and preferably by at least 50%, from the ratio in the same two directions for a control sample made from a melt consisting entirely of the polymer in anisotropic form and in that the article contains an inert filler. The concentration of the inert filler should be greater than 10% by volume and is preferably higher than 20% by volume to produce the maximum reduction in anisotropy ratio.

By "inert filler" is meant any filler, for example, particulate or fibrous fillers, which do not themselves react with the polymer of the composition but does not exclude fillers which have been surface treated to make them more compatible with the polymer matrix. Fillers treated with such surface treatments which react chemically with the polymer matrix are included within the scope of the term. The term includes fillers which have a beneficial effect on the physical properties of the compositions, including for example fillers which improve the strength of articles formed from the compositions. The term "inert filler+ also includes holes or voids in the polymer matrix produced by causing the polymer melt to foam.

A particularly useful class of fillers are glass fibres whether in the form of short fibres or glass mats. The effect of short glass fibres, i.e. fibres of about 2 mm or less in length on the anisotropy ratio is particularly surprising because when used in conventional polymers forming isotropic melts they generally increase rather than decrease anisotropy. By constrast, shaped articles formed according to the present invention containing about 20% by volume of short glass fibres have an anisotropy ratio which is about half that for articles formed from the same composition not containing the filler.

In addition to the use of short fibres shaped articles having the required reduction in anisotropy ratio can be produced by a method in which an anisotropic melt is caused to flow into a mould which contains obstacles to the path of flow of the melt, which obstacles become part of the final shaped articles. The mould may suitably contain a fibre mat which is constrained within the mould so that the alignment of polymer molecules in the anisotropic melt impinging on the constrained fibres is caused to be disturbed thus reducing the degree of overall anisotropy of the polymer in the mould while maintaining the processing and stiffness advantages of high local orientation. The low viscosity of the anisotropic melt enables the melt to penetrate and completely impregnate the glass fibre mat in contrast to conventional isotropic melt-forming polymers. The degree of reduction in the anisotropy ratio is surprising in view of the fact that the anisotropy ratio in conventional glass-filled compositions using isotropic melt-forming polymers as the matrix is increased by the presence of the glass fibre. The obstacle in the mould should be constrained so that it provides a resistance to the flow but is not substantially displaced. Thus in the case of a glass fibre mat the individual fibres may be displaced to a limited extent but the mat as a whole must be constrained so that it is not swept away by the inflow of the polymer melt.

Accordingly there is also provided a process of forming a shaped article from a polymer capable of exhibiting anisotropy in the melt comprising obtaining an anisotropic melt of the polymer and causing it to flow into a mould which contains an obstacle to flow constrained with the mould whereby the obstacle provides a resistance to the flow of melt.

In a further aspect of the invention the inert filler consists of at least 10% by volume of voids. Thus in a further method of reducing the anisotropic ratio in shaped articles formed from an anisotropic polymer melt the melt is caused to foam in the mould, for example, using conventional foaming agents operative at the temperature of the melt.

In this foaming process a foaming agent should be chosen which decomposes to liberate gaseous products within the temperature range over which the anisotropic melt-forming polymer exhibits anisotropic melt behaviour.

Accordingly there is also provided a process for forming a shaped article from a polymer capable of exhibiting anisotropy in the melt comprising obtaining an anisotropic melt of the polymer, causing the melt to foam, forming a shaped article from the foamed melt and quenching the foamed melt.

The degree of anisotropy may be assessed by a number of methods which measure properties of a moulding in at least two directions at right angles to each other. A convenient method is to cut a test piece from a shaped article formed in a mould. The test piece should have a square cross-section of 25 mm×25 mm and have a length of about 100 mm. The test piece should be cut from a region approximately in the centre of the shaped article. The test piece is then further sectioned to cut a slice 1.5 mm thick through the centre of the test piece and running the length of the test piece as shown in FIG. 1(a). The slice is cut to provide samples 1.5 mm×12 mm×25 mm as shown in FIG. 1(b). The test pieces are used to measure modulus using a Du Pont Dynamic Mechanical Analyser.

Qualitative differences in the degree of anisotropy are readily demonstrated using X-ray techniques. X-ray photos on sectioned samples may be examined using a polar densitometer. X-ray photographs were mounted on a polar table and the intensity traced round the main broad diffraction ring at $\theta = 20°$, that is Bragg spacing ~4.5A. This diffraction is the result of inter-chain interference and would occur as discrete spots on the equator from a sample of highly oriented fibre. As the orientation is reduced the spots will spread into arcs on the equator. For an unoriented isotropic sample the arcs would merge into a ring of uniform intensity.

The invention includes shaped articles and processes in which more than one of the above aspects are combined.

In the drawings FIGS. 1(a) and 1(b) illustrate the preparation of test specimens to be used in assessing the ratio of stiffness of the products in two directions at right angles.

The invention is further illustrated by reference to the following Examples.

EXAMPLE 1

A sample of copoly-chloro-1,4-phenylene ethylene dioxy-4,4'-dibenzoate terephthalate was made according to Example 3 of U.S. Pat. No. 3,991,013. The polyester had an inherent viscosity of 0.56 dl/g at 25° C. in a 0.5% solution of a mixture of 30% by volume of trifluoracetic acid and 70% by weight of dichloromethane. The polymer was tumble blended with azodicarbonamide (a foaming agent sold under the trade name 'Genetron' AC4) to give a concentration of 1.5% by weight of azodicarbonamide based on the total weight of blend. The composition was injection moulded at 265° C. in a 32 oz Ankerwerke single screw injection moulding machine using end-gated bar moulds of dimensions 150 mm×25 mm×25 mm. The moulding produced had a density 30% lower than an unfoamed sample prepared from the same polymer. The foam was of the closed cell type with a cell size ranging from about 15 to about 100 micron in diameter.

Figure 1A:
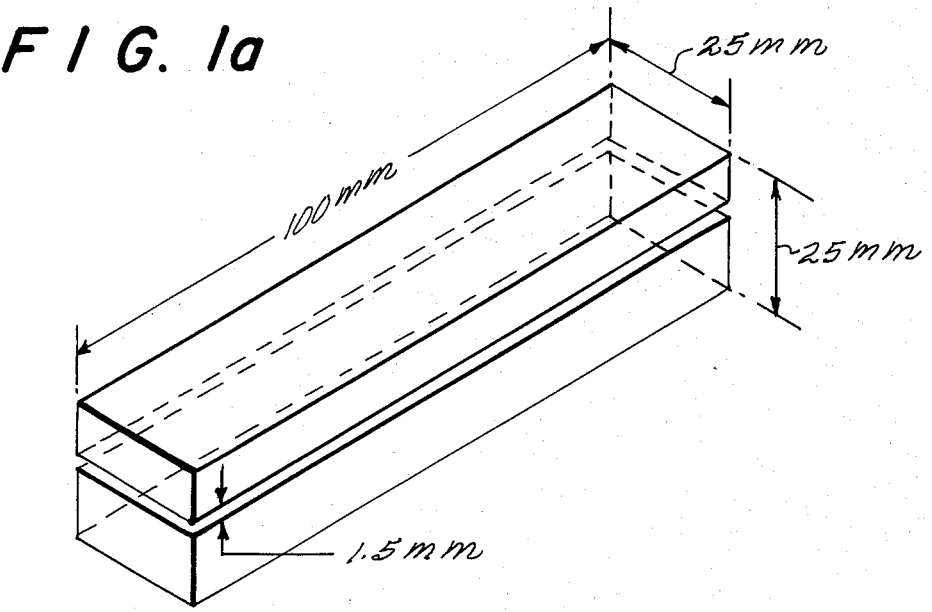
Figure 1B:
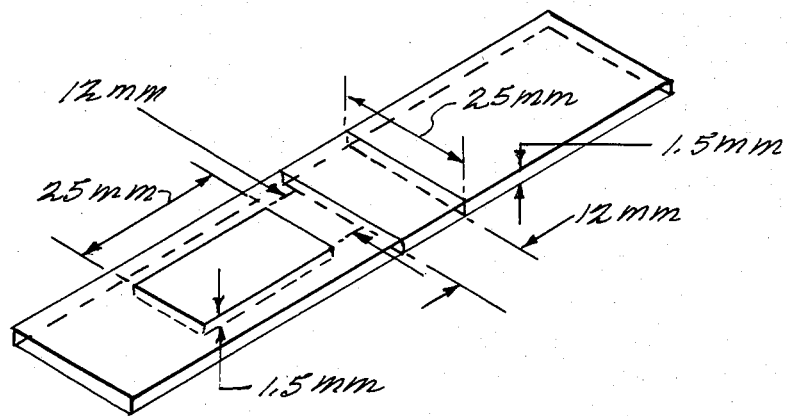
Figure 2:
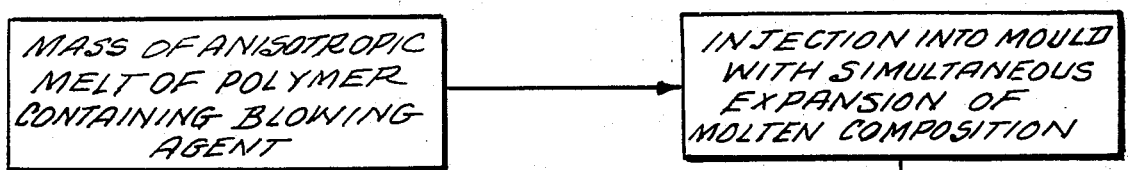
FIG. 2 is a flow diagram illustrating the steps of the method of reducing anisotropy by foaming as exemplified in Example 1.
Figure 3:
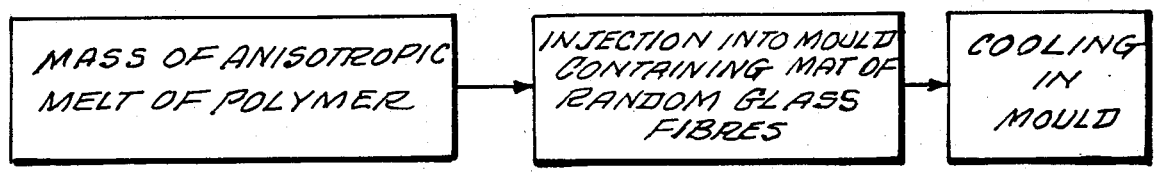
FIG. 3 is a flow diagram illustrating the steps of the method of reducing anisotropy by injecting into a mould containing obstacles to flow as exemplified in Example 2.
Figure 4:
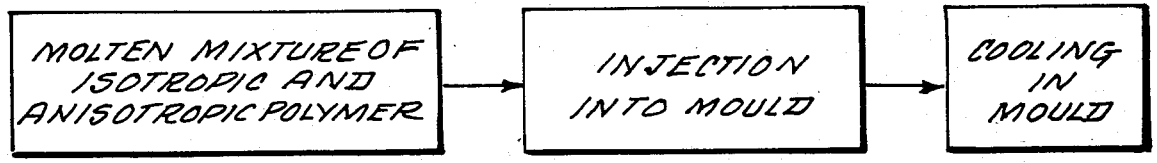
FIG. 4 is a flow diagram illustrating the steps of the method of reducing anisotropy by moulding a mixed melt of anisotropic and isotropic materials as exemplified in Example 6.
Figure 5:
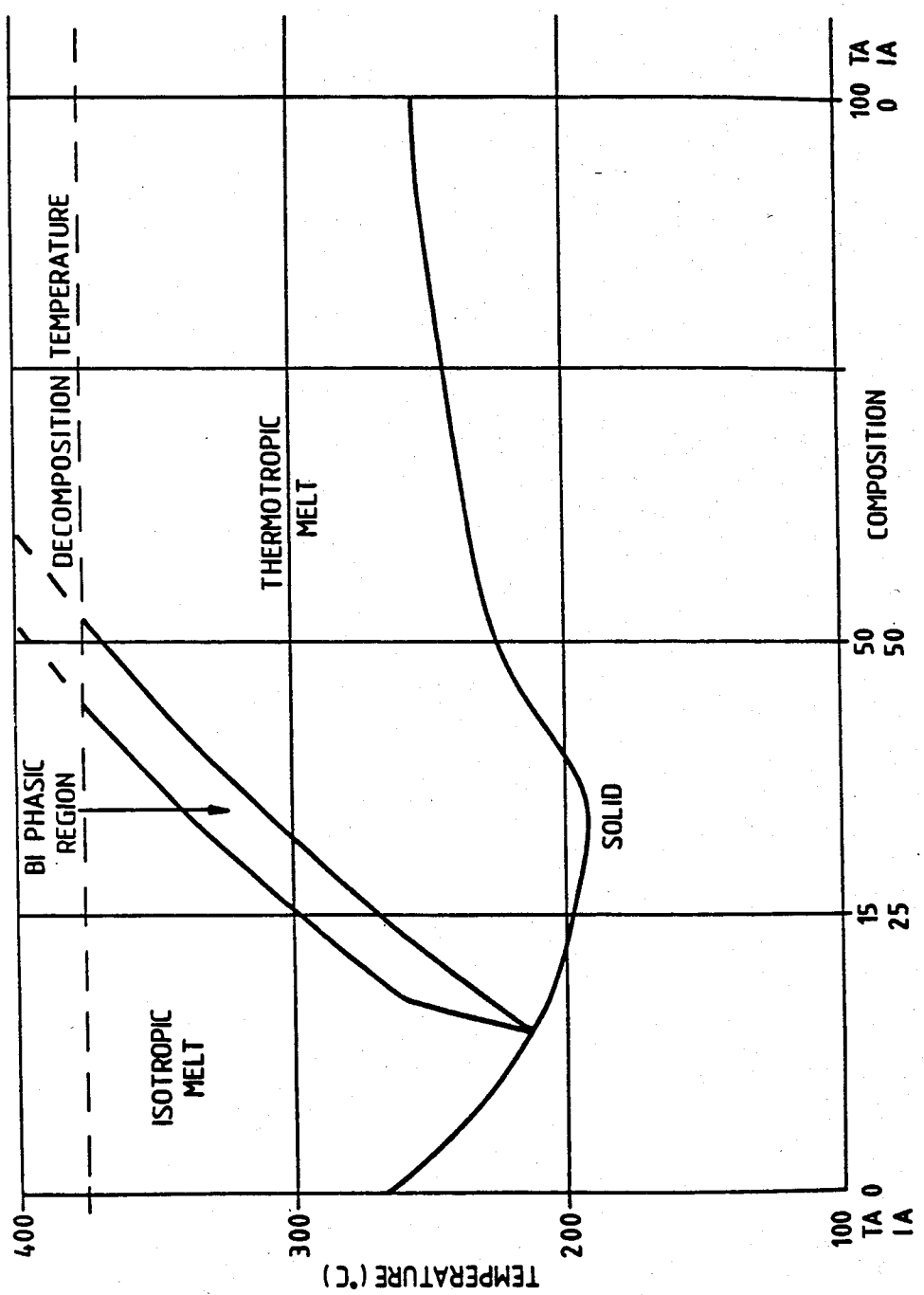
FIG. 5 illustrates the relationship between the nature of the melt and the melt temperature for the family of polyesters described in Example 5.

The moulded sample was sectioned to provide the samples illustrated in FIG. 1(a). The modulus values, measured along the lengths of the samples, are recorded in the Table below together with values for the unfoamed sample.

|  |  | Modulus (GPa) | Anisotropy Ratio |
|---|---|---|---|
| Foamed | Direction A | 1.53 | 0.9 |
|  | Direction B | 1.68 |  |
| Unfoamed | Direction A | 2.95 | 2.23 |
|  | Direction B | 1.32 |  |

EXAMPLE 2

A continuous strand glass mat was cut into 100 mm squares to fit tightly into the mould cavity of a Fox and Offord injection moulding machine. During operation the mould was heated to 75° C. and the glass mat was preheated in an oven at 200° C. before transferring to the mould. The polyester used in Example 1 was used at a melt temperature of about 280° C. for injection into the mould containing the glass fibre mat. Using an injection pressure of 1500 psi the melt was found to thoroughly penetrate the mat and wet the glass fibres. Moulded samples of glass content between 0 and 42.8% were produced. The glass-filled samples were found to have a reduced anisotropy ratio as measured by the procedure of Example 1 in comparison with the unfilled sample which had an anisotropy ratio of 4.1.

X-ray photographs also indicated that the overall degree of orientation with respect to directions of test and use in the glass-filled samples were considerably reduced with respect to the unfilled sample.

EXAMPLE 3

A number of compositions were prepared from the polyester used in Example 1 by tumble blending the polymer chip with 3 mm glass fibres (Owens Corning P429YZ) at the concentrations shown in the table below. The compositions were injection moulded on an Arburg injection moulding machine using the indicated conditions.

| Glass Content | | Injection Moulding Barrel Temperature (°C.) | Mould Temperature (°C.) | Flexural Modulus (GN/m²) | | | | | Tensile Strength MN/m² |
|---|---|---|---|---|---|---|---|---|---|
| % by weight | % by volume | | | Tensile Bar | 115 mm Disc | | | | |
| | | | | | 0° | 45° | 90° | Anisotropy Ratio | |
| 0 | 0 | 250 | 80-90 | 14.3 | 12.7 | — | 3.1 | 4.1 | 135 |
| 20 | 12.4 | 250 | 80-90 | 17.0 | 14.0 | 11.0 | 4.4 | 3.2 | 220 |
| 40 | 27.4 | 250-260 | 80-90 | 21.6 | 17.0 | 12.7 | 6.0 | 2.8 | 146 |
| 60 | 46.0 | 250-260 | 80-90 | 22.9 | 15.3 | — | 9.2 | 1.7 | — |

EXAMPLE 4

A composition containing 70% by weight (53.7% by volume) of wollastonite was prepared according to the procedure of Example 3. Test pieces were prepared on the Arburg injection moulding machine using a barrel temperature of 270° to 280° C. and a mould temperature of 80° to 90° C. The flexural modulus obtained on a tensile bar was 23.3 GN/m². Values of 18.4 and 14.1 GN/m² were obtained in the 0° and 90° directions on the 115 mm disc giving an anisotropy ratio of 1.3 compared with a value of 4.1 for a control sample containing no wollastonite.

Comparative data on conventional glass fibre filled polypropylene compositions showed that the anisotropy ratio increased from 1 for the unfilled composition to 2 at 30% by weight of glass fibre and to about 3 at 60% by weight of glass fibre.

EXAMPLE 5

A series of copolyesters based on 4,4'-oxydibenzoic, isophthalic, and terephthalic acids and chlorohydroquinone was prepared using the procedure outlined in Example 4 of U.S. Pat. No. 3,991,014. By varying the proportion of isophthalic to terephthalic acid it was possible to make a complete series of closely related compositions.

The compositions containing 0.5 mole of units derived from chlorohydroquinone, 0.25 mole of 4,4'-oxydibenzoic acid and varying proportions of terephthalic and isophthalic acids to give a total of 0.25 mole. The compositions were examined on a polarising microscope and the melt behaviour noted as the temperature of the melt was raised for a given composition. Above a ratio of about 15:85 terephthalic acid (TA):isophthalic acid (IA) the polymer exhibited a thermotropic (anisotropic) melt which on further heating changed to a bi-phase system of anisotropic and isotropic phases. Depending on the temperature and composition of the material this was observed as droplets of one type of material within the other as a matrix, that is either material could form the continuous phase, or alternatively as interconnecting networks. The result of this examination is shown diagrammatically in the Figure accompanying this specification. By operating under conditions which give a two-phase melt to form a shaped article and quenching the morphology in this condition, articles having a reduced anisotropy and a good balance of physical properties are obtained.

EXAMPLE 6

A polyester was prepared from chlorohydroquinone diacetate (1.3125 mole), 4,4'-dicarboxyphenyl ether (0.625 mole) terephthalic acid (0.2 mole) and isophthalic acid (0.425 mole) by heating the ingredients slowly in a round-bottomed flask fitted with a nitrogen inlet and stirrer to a temperature of 275° C. This temperature was maintained for 30 minutes and then raised to 290° C. When evolution of acetic acid ceased after about 30 minutes a vacuum was slowly applied. The temperature was maintained at 290° C. for 1 hour and raised to 310° C. for 3 hours. The polymer was cooled under vacuum.

The melt behaviour of a sample of the polymer was observed using a Leitz hot stage fitted to a Leitz "SM POL" model polarising microscope using the procedure described in British Patent Specification No. 1 507 207. The polymer was found to exhibit an anisotropic melt between 145° and 240° C. Between 240° C. and 270° C. a bi-phase melt was observed. Above 270° C. a wholly isotropic melt was formed.

The melt viscosity of the polymer was examined at 200° C. and 255° C. At a shear stress of 10⁴ N/m², viscosities of 95 Ns/m² and 40 Ns/m² respectively were obtained indicating that the polymer melt was still of low viscosity when present as a mixture of anisotropic and isotropic phases.

The polymer was injection moulded at melt temperatures of 200° and 255° C. respectively to determine the effect of the presence of isotropic material in the melt.

Mouldings were produced on an Arburg injection moulding machine using a screw speed of 150 rpm and a mould temperature of 40° C. Flexural modulus values obtained on these samples are recorded below:

| Barrel Temperature (°C.) | Flexural Modulus GN/m² | | Anisotropy Ratio |
| --- | --- | --- | --- |
| | 0° | 90° | |
| 200 | 4.67 | 2.81 | 1.66 |
| 255 | 4.25 | 3.06 | 1.39 |

We claim:

1. A shaped article formed from a polymer which is capable of exhibiting anisotropy in the melt which has been prepared by obtaining a melt of the polymer in a temperature range over which the polymer exhibits a two-phase melt of the polymer molecules in both isotropic and anisotropic form and below the decomposition temperature of the polymer, forming a shaped article from said two-phase melt and cooling the melt at a rate sufficient to retain the disposition of the melt so that a mixture of polymer in oriented and random form is obtained in the shaped article.

2. A process of forming a shaped article from a polymer which is capable of exhibiting anisotropy in the melt comprising obtaining a melt of the polymer in a temperature range over which the polymer exhibits a two-phase melt of the polymer molecules in both isotropic and anisotropic form and below the decomposition temperature of the polymer, forming a shaped article from said two-phase melt and cooling the melt at a rate sufficient to retain the disposition of the melt so that a mixture of a polymer in oriented and random form is obtained in the shaped article.

3. A process of forming a shaped article according to claim 2 in which the article is formed from a melt which is at least 5° C. above the temperature at which the melt is wholly anisotropic.

4. A process of forming a shaped article according to claim 2 comprising forming a melt from a mixture of polymers which differ in solubility parameter by not more than 2 units at least one of which polymers is present as a two-phase melt containing anisotropic and isotropic species, the remaining polymer or polymers also being present in melt form.

5. A process of forming a shaped article form a polymer capable of exhibiting anisotropy in the melt comprising obtaining an anisotropic melt of the polymer and causing it to flow into a mould which contains an obstacle to flow constrained within the mould whereby the obstacle provides a resistance to the flow of melt and reduces the anisotropy of the melt, and cooling the melt whilst the anisotropy is so reduced to form the shaped article.

6. A process for forming a shaped article from a polymer capable of exhibiting anisotropy in the melt comprising obtaining a foamable anisotropic melt of the polymer, which can be caused to foam within the temperature range over which the polymer exhibits anisotropy, causing the melt to foam, whereby there is a reduction in the anisotropy of the melt forming a shaped article from the foamed melt and cooling the foamed melt to provide a foamed shaped article having a reduced anisotropy in comparison with an unfoamed shaped article having the same composition.

* * * * *